United States Patent [19]

Saotome et al.

[11] Patent Number: 4,953,723

[45] Date of Patent: Sep. 4, 1990

[54] APPARATUS FOR SUPPRESSING QUAKY MOVEMENTS OF MOBILE CRANES

[75] Inventors: Yoshimi Saotome, Takasago; Kiyotsuna Kuchiki; Tsuyoshi Katada, both of Kakogawa, all of Japan

[73] Assignee: Kabushiki Kaisha Kobe Seiko Sho, Kobe, Japan

[21] Appl. No.: 391,048

[22] Filed: Aug. 9, 1989

[30] Foreign Application Priority Data

Apr. 21, 1989 [JP] Japan .................................. 1-103250

[51] Int. Cl.⁵ ........................ B66C 13/12; B66C 23/56
[52] U.S. Cl. ..................................... 212/159; 212/146; 212/149; 212/153; 212/182; 212/261; 212/265; 60/413; 60/469; 91/437
[58] Field of Search ..................... 91/437; 60/413, 469; 212/146, 182, 203, 211, 227, 231, 236, 237, 238, 255, 261, 149, 153, 159

[56] References Cited

U.S. PATENT DOCUMENTS

| | | | |
|---|---|---|---|
| 3,814,265 | 6/1974 | Miller | 212/238 |
| 3,922,854 | 12/1975 | Coeurdera | 60/413 |
| 4,046,270 | 9/1977 | Baron et al. | 60/413 |
| 4,085,587 | 4/1978 | Garlinghouse | 60/413 |
| 4,142,368 | 3/1979 | Mantegani | 60/413 |
| 4,341,149 | 7/1982 | Dezelan | 60/416 |
| 4,367,673 | 1/1983 | Krueck et al. | 91/437 |
| 4,674,638 | 6/1987 | Oliphant | 212/182 |

FOREIGN PATENT DOCUMENTS 707161  4/1965  Canada .................................. 60/469

*Primary Examiner*—Joseph F. Peters, Jr.
*Assistant Examiner*—R. B. Johnson

*Attorney, Agent, or Firm*—Oblon, Spivak, McClelland, Maier & Neustadt

[57] ABSTRACT

An apparatus for damping quaky movements of a mobile type crane includes the prohibition of the formation of a closed damping circuit through the opposing oil chambers of a boom uplifting cylinder in working mode or a crane operation in travel mode of the crane, enhancing safety in crane operation while ensuring effective quake damping action in vehicle travel. The apparatus includes a vehicle body supported on driven wheels; a boom pivotally supported on the vehicle body through a hydraulic cylinder for pivoting movements about a horizontal shaft; main hydraulic pumps connected through a transmission mechanism to an engine mounted on the vehicle body and switchable between on- and off-positions; a direction control valve for selectively supplying and draining the discharge oil pressures of the main pumps to and from a first load-holding main oil chamber and an opposing second oil chamber of the cylinder; a counter-balancing valve provided between the cylinder and directionh control valve; an accumulator provided between the cylinder and counter-balancing valve for suppressing quaky movements of the vehicle body; a mode selector means for switching the mode of operation between a vehicle travel mode forming a closed circuit through the first and second oil chambers and in communication with the accumulator, and a working mode cancelling the closed circuit and supplying and draining oil pressures separately to and from the first and second oil chambers; and a controller adapted to permit a switch to the travel mode position of the travel mode selector only when the main pumps are in an off state.

6 Claims, 6 Drawing Sheets

APPARATUS FOR SUPPRESSING QUAKY MOVEMENTS OF MOBILE CRANES

BACKGROUND OF THE INVENTION

1. Field of the Invention

This invention relates to an apparatus for suppressing vibrations or quaky movements in travel of a mobile or automotive type crane like rough terrain crane.

2. Prior Art

Figure 5:
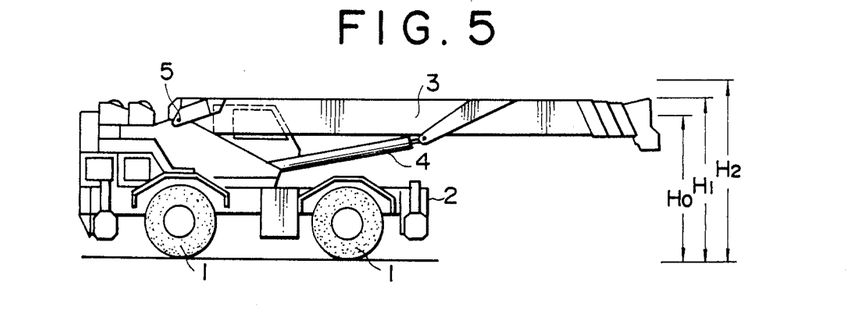
FIG. 5 is a schematic side view of a mobile type crane.

As illustrated in FIG. 5, mobile cranes generally have a boom 3 pivotally supported on a vehicle body 2 which is supported on driven vehicle wheels 4, for pivotal movements about a horizontal shaft 5 through a boom uplifting cylinder 4. With a mobile crane of this sort, it is usually experienced that the vehicle body 2 is subjected to vibrations and quaky movements during travel due to undulations or irregularities on road surfaces or due to abrupt accelerations or decelerations of the vehicle body 2, accompanied by vertical quaky movements of the boom 3 and other components which add to the vibrations of the vehicle body 2, giving ride discomfort to the operator on the vehicle.

Figure 6:
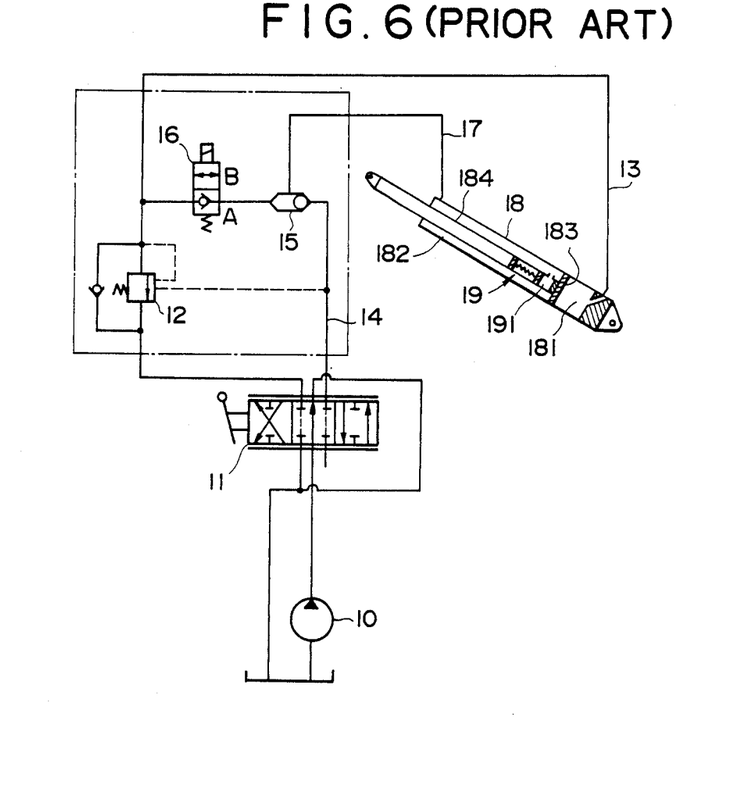
FIG. 6 is a diagram of a hydraulic circuit of the conventional apparatus.

For the purpose of damping such vibrations in travel, there has been known in the art an apparatus as disclosed in Japanese Laid-Open Patent Application No. 59-182195. As seen in FIG. 6, this prior art apparatus employs a damper mechanism 19 which is built in a boom uplifting hydraulic cylinder 18. It includes a counter-balancing valve 12 provided in a conduit 13 in communication with an oil chamber 181 which holds the load of the cylinder 18, and an electromagnetic change-over valve 16 and a shuttle valve 15 which are provided between the conduit 13 and a conduit 17 which is connected to the other oil chamber 182 or a conduit 14 which is in communication with a direction control valve 11.

According to this apparatus, if the direction control valve 11 is switched to a boom-up or boom-down position when the change-over valve 16 is in position A, the oil pressure is supplied to the oil chamber 181 or 182 of the cylinder 18 to stretch or contract the cylinder 18 for uplifting or lowering the boom. With a boom angle in excess of 10°, the change-over valve 16 is held in an interlocked state to prevent a switch to position B, and, with a boom angle smaller than 10°, the change-over valve 16 is relieved of the interlocked state. Thereafter, if a rocker switch is operated into an engaging position, the change-over valve 16 is switched to position B, communicating the conduit 13 with conduit 17 through the electromagnetic valve 16 and shuttle valve 15, thereby communicating the oil chambers 181 and 182 and an oil chamber 191 of the damper mechanism 19 with each other to form a closed circuit thereby suppressing vibrations relative to the vehicle body 1 when the vehicle is in travel.

In the above-described conventional apparatus, the boom angle alone is used as the criterion in making a judgement as to cancelling or holding the interlocked state. Namely, the interlocking is automatically cancelled as soon as the boom angle becomes smaller than 10° during operation of the crane no matter whether a load is still in suspended state or the boom is in a stretched state. Under these circumstances, there are possibilities of the change-over valve being switched to position B due to an erroneous operation by the operator or for other reasons. Besides, after a vehicle travelling operation, the change-over valve 16 remains in position B if the boom angle is smaller than 10°, so that by mistake the operator might start a crane operation in this state by stretching or contracting the boom or hoisting a suspended load.

If the change-over valve 16 is switched to position B during a crane operation or if a crane operation is started while the change-over valve 16 still remains in position B after a vehicle travelling operation, the oil chamber 181 which holds the load of the cylinder 18 is communicated with the other oil chamber 182 by a closed circuit, and the pressure which acts in the oil chamber 181 for holding a load such as a suspended load also acts in the other oil chamber 182. Therefore, the effective pressure receiving area of the main piston 183 in the oil chamber 181 becomes an area which corresponds to the sectional area of the piston rod 184, resulting in an abnormal increase in the load holding pressure in the oil chamber 181. In some cases, depending upon the weight of the suspended load and the length of the boom 3, the load holding pressure in the oil chamber 181 could exceed the preset relieving pressure level of the counter-balancing valve 12 and open an overload valve of the counter-balancing valve 12 to contract the cylinder 18. Whereupon, there occurs a sudden downfall of the boom 3 and the suspended load, giving a great shock to the vehicle body 2. In the worst case, the cylinder 18 and the hollow piston rod (inner cylinder) 184 are damaged by overloading.

In addition to the above-mentioned problems, the conventional apparatus with the damper mechanism 19 built in the cylinder 18 is objectionably complicated in construction, and disadvantageous from the standpoint of fabrication process and cost. Moreover, since the oil chamber 191 of the damper mechanism 19 is constantly in communication with the oil chamber 182, it is put under the influence of pressure fluctuations in the oil chamber 182 even during crane operations and is therefore susceptible to troubles such as needing repairs and maintenance and service at an increased frequency.

SUMMARY OF THE INVENTION

The present invention has as its object the elimination of the above-mentioned problems or drawbacks of the conventional apparatus, more specifically the provision of an apparatus for suppressing vibrations and quaky movements of a mobile type crane, which is capable of holding the interlocked state in crane operation irrespective of erroneous operation by an operator to prohibit communication between the load-holding oil chamber and the other oil chamber of the hydraulic cylinder (i.e., to prohibit a switch to the travel mode), while efficiently suppressing quaky movements of the vehicle body during travel to ensure a markedly improved ride comfort for the operator. The apparatus of the invention is also adapted to prohibit crane operation in the travel mode to prevent rapid downfalls of the boom as well as damage to the cylinder, reducing troubles of the damper mechanism and facilitating maintenance and service.

It is another object of the invention to provide an apparatus for suppressing quaky movements, which is capable of resetting the boom at an appropriate level for travel in the event the boom is dropped below that level due to oil leaks from the closed circuit including the cylinder in an initial phase of a vehicle travel operation immediately after a switch to the travel mode or during a vehicle travelling operation over a long period of time.

In accordance with the present invention, there is provided an apparatus for suppressing quaky movement of a mobile type crane, essentially including: a vehicle body supported on driven wheels; a boom pivotally supported on the vehicle body through a hydraulic cylinder for pivoting movements about a horizontal shaft; main hydraulic pumps connected through a transmission mechanism to an engine mounted on the vehicle body and switchable to one of on-and off-positions; a direction control valve for selectively supplying and draining the discharge oil pressures of the main hydraulic pumps to and from a first load-holding main oil chamber and an opposing second oil chamber of the hydraulic cylinder; a counter-balancing valve provided between the hydraulic cylinder and the direction control valve; an accumulator provided between the hydraulic cylinder and the counter-balancing valve for suppressing quaky movements of the vehicle body; a mode selector means for switching the mode of operation between a vehicle travel mode forming a closed circuit through the first and second oil chambers and in communication with the accumulator, and a working mode cancelling the closed circuit and supplying and draining oil pressure separately to and from the first and second oil chambers; and a controller adapted to permit a switch to the travel mode position of the mode selector means only when the main hydraulic pump is in the rest position.

In a preferred form of the inventioin, the mode selector means is constituted, for example, by a first change-over valve selectively switchable between a working mode position for communicating the second oil chamber with the direction control valve and a travel mode position for blocking outflow of oil pressure from the second oil chamber to the direction control valve, a second change-over valve selectively switchable between a working mode position for blocking inflow of oil pressure to the second oil chamber from the first oil chamber of the hydraulic cylinder and a travel mode position for communicating these two oil chambers, and a third change-over valve selectively switchable between a working mode position for blocking inflow of oil pressure to the accumulator from the second oil chamber and a travel mode position for communicating the second oil chamber with the accumulator.

In another preferred form of the invention, the first and third change-over valves of the mode selector means are each constituted by an electromagnetic change-over valve, while the second change-over valve is constituted by a pilot-operated change-over valve which is adapted to take the working mode position when a pilot pressure applied from an accumulator conduit between the third change-over valve and the accumulator is lower than a predetermined level and otherwise to take the travel mode position.

Preferably, the apparatus of the invention further includes a transmission switch for turning on and off the transmission mechanism, and a mode selector switch for selecting either one of the working and travel modes, the controller having a control means for switching the respective electromagnetic valves to the travel mode positions when the transmission is off and the travel mode is selected by the mode selector switch, otherwise holding the working mode positions.

In a further preferred form of the invention, the apparatus includes a boom sensor means for detecting the operating condition of the boom, and the controller includes control means for switching the respective electromagnetic valves to the travel mode when receiving a signal indicative of off-state of the transmission mechanism, a travel mode selection signal produced by the mode selector switch and a signal indicative of normal travel position of the boom, otherwise holding the electromagnetic valves in the working mode positions.

In still another preferred form of the invention, the apparatus includes an auxiliary hydraulic pump which is constantly driven by the engine, a fourth change-over valve of electromagnetic type selectively switchable between a working mode position for draining oil from the accumulator and a travel mode position for blocking outflows of oil from the accumulator, and a fifth change-over valve of electromagnetic type selectively switchable between an oil supply position for supplying oil pressure from the auxiliary pump to the accumulator and a blocking position for blocking the oil supply.

With the above-described construction, even when an operator makes an error in operating procedure, it is not possible to switch the operation to the travel mode as long as the main hydraulic pumps are in driven state, preventing formation of the closed circuit which comunicates the first and second oil chambers of the boom uplifting cylinder with each other. This also prevents the load-holding pressure in the cylinder from rising to an abnormally high level, precluding abrupt downfalls of the boom and damage to the cylinder in a secure manner. Besides, the accumulator which is provided outside the hydraulic cylinder, namely, which is provided between the hydraulic cylinder and the direction control valve as a damper mechanism for suppression of displacements, is far simplified in construction as compared with the damping mechanism built in the hydraulic cylinder, less susceptible to troubles and facilitated in maintenance and service.

Further, the combination of the above-described change-over valves improves the maneuverability and controllability in operation. The boom can be easily reset in a travel position at an appropriate level through the auxiliary hydraulic pump and the fifth change-over valve in the event it drops from that level in an initial phase of operation immediately after switching the operation to the travel mode or due to oil leaks from the closed circuit including the hydraulic cylinder when continuing an operation in the travel mode over a long period of time.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Figure 1:
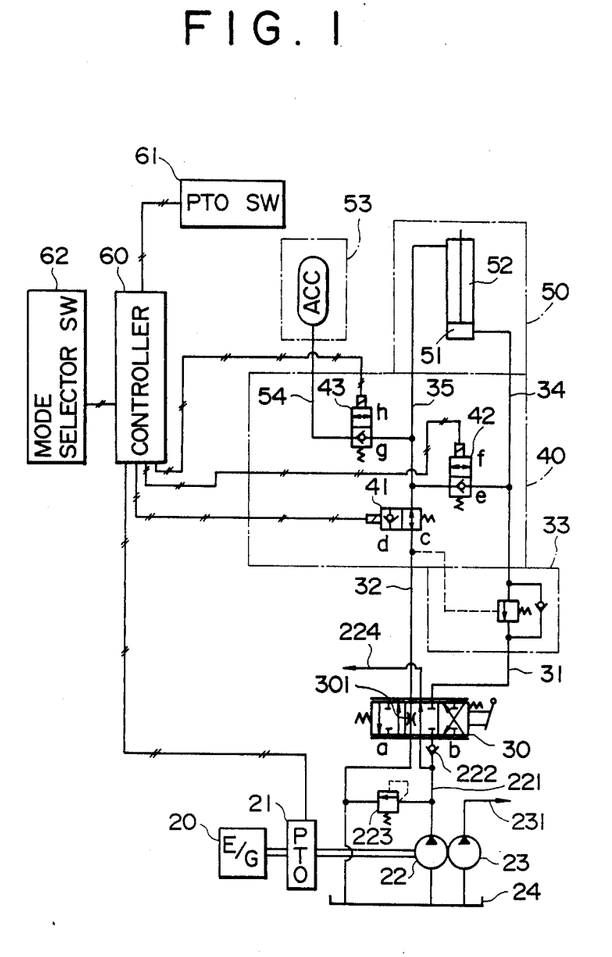
FIG. 1 is a diagram of a hydraulic circuit in an embodiment of the present invention.

Referring to FIG. 1, there is shown an embodiment of the invention, in which the engine indicated at 20 is mounted on a mobile type crane as shown in FIG. 5. Coupled with this engine 20 through a power transmission mechanism (PTO) are a plural number of main hydraulic pumps 22 and 23. A conduit 221 in communication with the discharge side of the main pump 22 is connected to a check valve 222 and a relief valve 223 and also to a boom uplifting hydraulic cylinder 50 (corresponding to a cylinder 4 in FIG. 5) through a direction control valve 30, conduits 31 and 32, a counter-balancing valve 33, a mode switching means 40, and first and second conduits 34 and 35. A conduit 224 led out from the direction control valve 30 and a conduit 231 on the discharge side of the pump 23 are connected through another direction control valve to working component actuators such as a boom stretching hydraulic cylinder, a winch operating hydraulic motor and the like.

The mode switching means 40 is constituted by first to third change-over valves 41 to 43. The first change-over valve 41 is selectively switchable between a position c for communicating the conduit 32 with the second conduit 35 with each other and a position d for blocking outflow of oil from the second conduit 35 to the conduit 32 while permitting reverse oil flow. The second change-over valve 42 is selectively switchable between a position e for blocking oil flow from the first conduit 34 to the second conduit 35 while permitting oil flow in the reverse direction, and a position f for communicating these two conduits 34 and 35 with each other. The third change-over valve 43 is selectively switchable between a position g for permitting oil flow to the second conduit 35 from a conduit 54 connected to an quake suppressing accumulator 53 while blocking oil flow in the reverse direction, and a position h for communicating the conduit 35 and 54 with each other. In this particular embodiment, the change-over valves 41 to 43 are each constituted by an electromagnetic change-over valve.

In order to start a crane operation, the transmission switch (PTO switch) 61 is first turned on, whereupon the transmission mechanism 21 is actuated through the controller 60 to drive the pumps 22 and 23. On the other hand, unless manipulated, the mode switch 62 is in the working mode position, holding (interlocking) the change-over valves 41 to 43 respectively in the positions c, e, g (working mode) shown.

Now, if the direction control valve 30 is switched to a boom-up position a, the discharge oil of the pump 22 flows into the first oil chamber 51 through the counter-balancing valve 33 to expand the cylinder 50, and the oil in the second oil chamber 52 is returned to a tank 24 through the first change-over valve 41 and direction control valve 30. If the direction control valve 30 is switched to a boom-down position b, the discharge oil of the pump 22 conversely flows into the second oil chamber 52 through the first change-over valve 41, and by this oil pressure the counter-balancing valve 33 is opened to return the oil in the first oil chamber 51 to the tank 24, thereby contracting the cylinder 50.

As the cylinder 50 is telescopically expanded or contracted, the boom 3 of FIG. 5 is turned up or down about a pivoting shaft 5 to control the boom angle. On such an occasion, a high pressure is generated in the first oil chamber 51 and first conduit 34 by the weights of the boom 3 and a suspended load or the like. However, since the second change-over valve 42 is in position e, there is no possibility of the high pressure oil flowing toward the second conduit 35, namely, toward the rod side of the cylinder 50 or toward the tank 24. Further, since the third change-over valve 43 is in position g, there is no possibility of the oil in the second conduit 35 flowing out toward the accumulator 53. Accordingly, the pressure oil is supplied to the first or second oil chamber 51 or 52 of the cylinder 50 at an appropriate rate commensurate with the extent of shift (spool open area) of the direction control valve 30 to turn up or down the boom appropriately, without interference by the accumulator 53.

Then, if the direction control valve 30 is returned to neutral position, the supply of pressure oil from the pump 22 to the respective oil chambers 51 and 52 of the cylinder 50 is stopped, and outflow of oil from the first oil chamber 51 is blocked by the counter-balancing valve 33 and the second change-over valve 42 in position e to stop the cylinder 50, holding the boom 3 at a desired angular position. At this time, the second conduit 35 is communicated with the tank 24 through the first change-over valve 41 in position c and a throttle 301 of the direction control valve 30, so that the second oil chamber 52 reaches the tank pressure. The third change-over valve 43 in position g permits oil flow from the conduit 54 to conduit 35, so that the pressure in the accumulator 53 also reaches the tank pressure.

Upon switching another direction control valve which is not shown, the discharge oil of the pumps 22 and 23 is supplied to a boom stretching hydraulic cylinder as well as to a winch operating hydraulic cylinder to stretch or contract the boom 3 and to move up or down a suspended load.

Since the transmission mechanism 21 is turned on and the pumps 22 and 23 are actuated during crane operation, the change-over valves 41 to 43 are held respectively in positions c, e, and g, namely, are all interlocked in the working mode by a signal from the controller 60. Therefore, these change-over valves 41 to 43 would not be switched to travel mode positions even if the mode selector switch were erroneously pressed by the operator to select the travel mode. It follows that there is no possibility of the two oil chambers 51 and 52 of the cylinder 50 being inadvertently communicated with each other by a closed circuit, and of the pressure in the first oil chamber 51 being increased to an abnormally high level which might lead to damage of the cylinder 50.

On the other hand, in order to produce the quake suppressing effects efficiently during travel of the vehicle, the boom 3 is shrunk substantially to the most contracted state as shown in FIG. 5, and, after removing a suspended load, the cylinder 4 (shown at 50 in FIG. 1) is expanded slightly from its most contracted state to hold the fore end of the boom at a height of $H_1$ from the ground surface, i.e., at a level slightly higher than its lower limit height $H_0$, while engaging the crane (not shown) with the vehicle body with a suitable degree of flexibility. In this connection, the height of the boom cannot be increased beyond the vehicle height limit $H_2$ which is stipulated by regulations with regard to travel on roads. Accordingly, the appropriate height $H_1$ of the boom in travel is $H_0 < H_1 < H_2$.

After holding the boom 3 in a appropriate state in this manner, the transmission switch 61 is turned off to stop the pumps 22 and 23, whereupon a transmission-off signal is fed to the controller 60 which then cancels the interlocking of the change-over valves, permitting to switch them to the travel mode positions.

Thereafter, upon selecting the travel mode by manipulating the mode selector switch 62, the change-over valves 41 to 43 are switched respectively to positions d, f and h (travel mode positions) by the controller 60. In this position, one end of the first conduit 34 is blocked by the counter-balancing valve 33 while one end of the second conduit 35 is blocked by the first change-over valve 41 in position d, communicating the conduits 34 and 35 with each other through the second change-over valve 42 in position f by a closed circuit which is in communication with the accumulator 53 through the third change-over valve 43 in position h. Consequently, the load pressure acting in the first oil chamber 51 of the cylinder 50 is led to the accumulator 53 to accumulate therein a pressure equivalent to the load pressure.

Now, to move the vehicle, the wheels 1 are driven by the vehicle drive mechanism. When the vehicle is in travel, the vehicle body 2 is vibrated due to undulations or irregularities on road surface or due to accelerations or decelerations of the vehicle, causing the boom 3 to quake up and down accompanied by contracting and stretching movements of the cylinder 50. At this time, the opposite oil chambers 51 and 52 of the cylinder 50 are communicated with each other and with the accumulator 53 by the closed circuit, so that the pressure fluctuations resulting from the contracting and stretching movements of the cylinder 50 are suppressed by the accumulator 53 and pressure losses in the conduits of the closed circuit, thereby suppressing the vibrations and quaky movements of the vehicle body 2 to improve the comfort of ride.

The transmission mechanism 21 is off and the pumps 22 and 23 are at rest during the vehicle travel, so that, even if the direction control valve 30 were switched during a vehicle travelling operation by an operator erroneously touching a boom upturning lever, the cylinder 50 would not be actuated to prevent the boom 3 from being uplifted inadvertently. Further, even if a boom-stretching direction control valve (not shown) or a direction control valve (not shown) for operating the hoisting winch were switched into on-position, it is not possible to stretch or contract the boom or to lift up or down a lifting load. Consequently, the pressure in the first oil chamber 51 of the cylinder 50 is prevented from rising to an abnormally high level to enhance the safety of operation. Besides, the deactuation of the pumps 22 and 23 has an effect of energy saving, and the power of the engine 20 can be effectively used for the vehicle drive.

In the foregoing embodiment, the accumulated pressure of the accumulator 53 becomes level with the tank pressure in the working mode. Therefore, when the operation mode is switched from the working to travel mode, the cylinder 50 is contracted in an initial phase of the travel mode operation by a slight degree corresponding to the compression volume of the pressure oil accumulated in the accumulator 53 from the first oil chamber 51 of the cylinder 50, and this might cause the boom 3 to drop from the initially adjusted height. In such a case, however, since the transmission mechanism 21 is off and the pumps 22 and 23 are also off, the cylinder 50 cannot be stretched or contracted even if the direction control valve 30 is switched. This can be avoided by setting the boom at a higher level prior to switching the operating mode to the vehicle travel mode, more specifically at a level which is higher than the appropriate travelling height $H_1$ by a measure corresponding to the expected drop of the boom. This step can be omitted by employing the arrangement as shown in FIG. 2.

Figure 2:
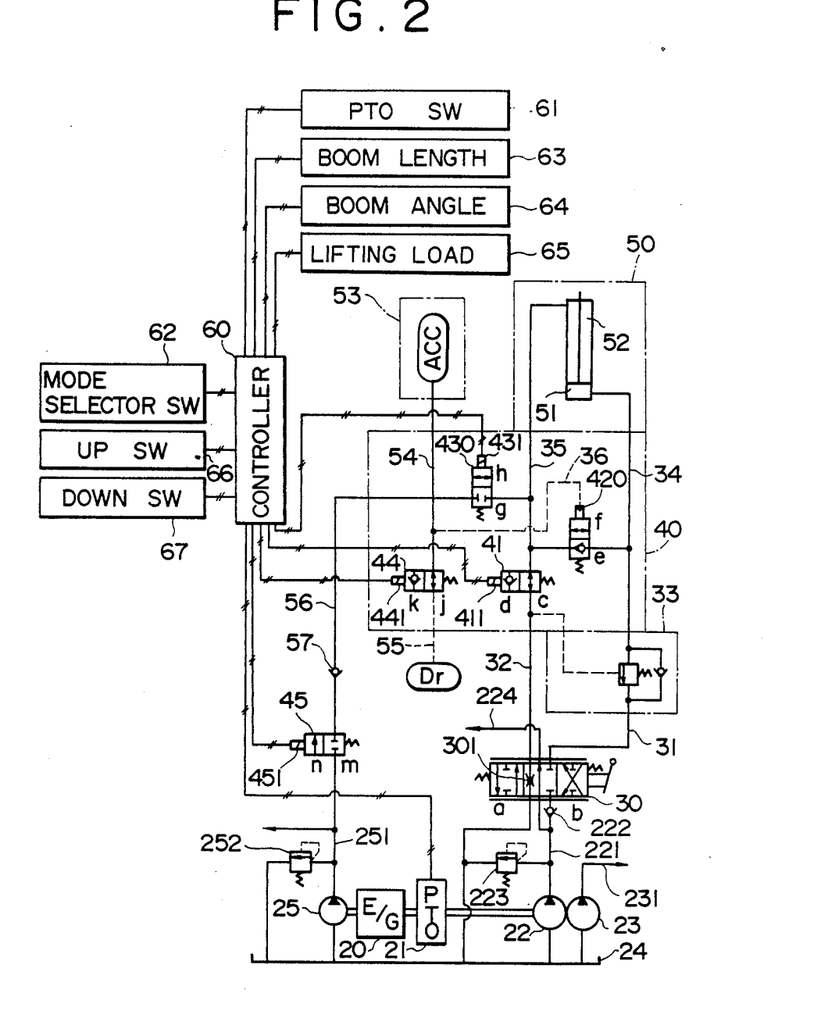
FIG. 2 is a diagram of a hydraulic circuit in another embodiment of the invention.

Illustrated in FIG. 2 is another embodiment of the invention, in which a pilot-operated type change-over valve (a second change-over valve) 420 is used in place of the electromagnetic change-over valve 42 of FIG. 1. This change-over valve 420 is held in position e when the accumulated pressure of the accumulator 53, which is led to a pilot conduit 36, is lower than a predetermined level, and switched to position e when higher than the predetermined level. Third change-over valve 430 differs from the third change-over valve 43 of FIG. 1 in that it communicates the accumulator conduit 54 with conduit 35 when in position h, and blocks the communication between these conduits 54 and 35 when in position g. Fourth change-over valve 44 is selectively switchable between position j for permitting oil outflow from the accumulator conduit 54 to the drain conduit 55, and position k for blocking such oil outflow. Fifth change-over valve 45 is located between a replenishing conduit 56 connected to the conduit 54 and a discharge conduit 251 of the auxiliary hydraulic pump 25, and selectively switchable between replenishing position n for supplying oil from the pump 25 to the accumulator 53 and position m for blocking the oil replenishment. The auxiliary pump 25 is directly coupled with the engine 20 and constantly driven therefrom irrespective of the on-and off-positions of the transmission mechanism 21. Indicated at 57 is a check valve, and at 252 is an auxiliary relief valve.

The controller receives various input signals including on- and off-signals of the transmission switch 61, signals from boom length sensor 63, boom angle sensor 64 and lifting load sensor, a mode signal from the mode selector switch 62, and on- and off-signals of UP and DOWN switches 66 and 67, energizing or de-energizing the solenoids 411, 431, 441 and 451 of the change-over valves 41, 430, 44 and 45 on the basis of these input signals.

Figure 3:
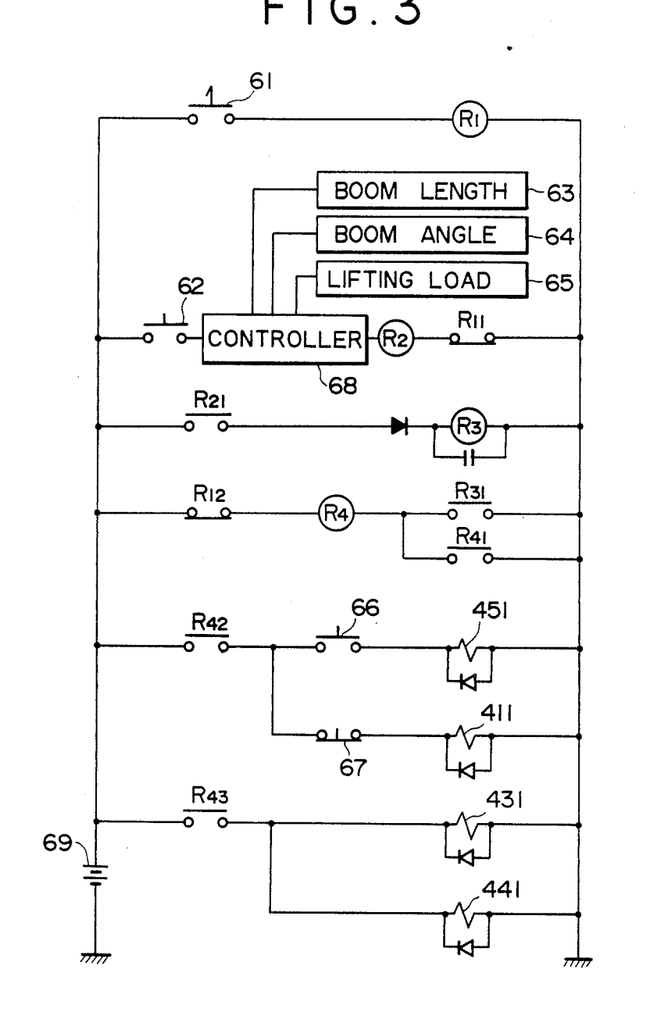
FIG. 3 is a diagram of an electric circuit employed in the present invention for the control of the hydraulic circuit.

For the control of these valves, the controller 60 is provided with, for example, an electric control circuit as shown in FIG. 3.

In FIG. 3, the mode selector switch 62 is turned off in the working mode and turned on in the travelling mode. The UP switch is a normally open switch, and DOWN switch 67 is a normally closed switch. The solenoids 411, 431, 441 and 451 of the respective change-over valves are connected to a battery or a suitable power source 69 through the afore-mentioned switches, arithmetic unit (control means) 68, relays R1 to R4 and the respective relay contacts.

The arithmetic unit (control means) 68 receives the output signals of the respective sensors 63 to 65, and completes the circuit when these signal are appropriate values for vehicle travel, namely, when $$1 \leq l_0 + \alpha, \theta \leq \theta_0 + \beta, W \leq W_0 + \gamma$$

where
  l: Detected boom length;
  $l_0$: Minimum contracted boom length;
  $\theta$: Detected boom angle;

$\theta_0$: Appropriate boom angle in travel;
W: Detected weight of lifting load;
$W_0$: Basic weight without lifting load; and
$\alpha, \beta, \gamma$: Error tolerances
opening the circuit when any one of the signals from the sensors is not of an appropriate value for travel.

Figure 4:
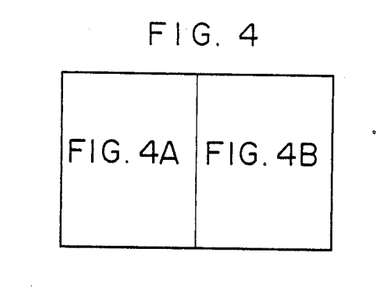
FIG. 4 is a flowchart of the control.
Figure 4A:
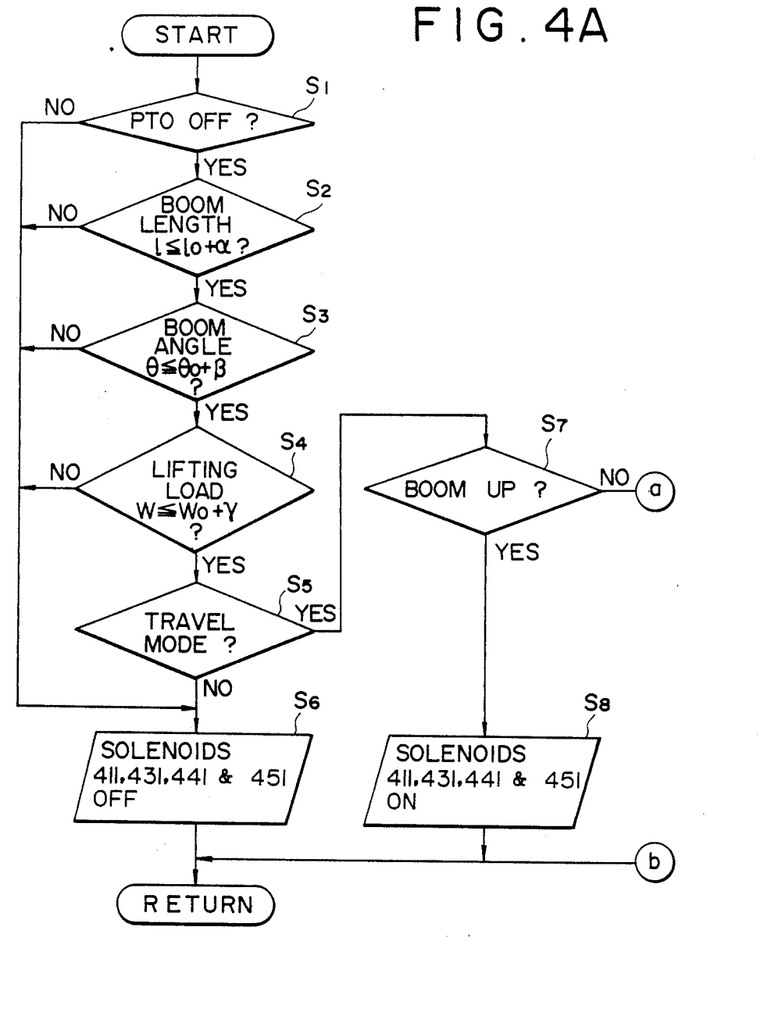
Figure 4B:
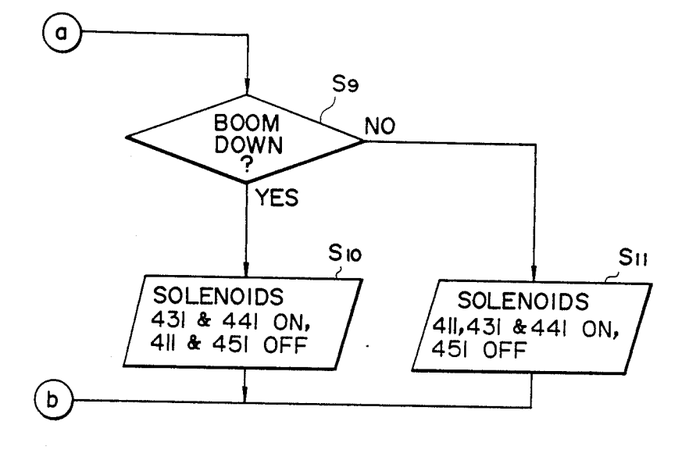

Shown in FIG. 4 is a flowchart of the control which is performed by the electric control circuit of FIG. 3.

Namely, referring to FIGS. 2 to 4, upon turning on the transmission switch 61, the transmission mechanism (PTO) 21 is actuated to drive the main pumps 22 and 23. While, the auxiliary pump 25 is constantly driven irrespective of the on- and off-states of the transmission mechanism 21.

On the other hand, as the transmission switch 61 is turned on, the relay R1 of FIG. 3 is actuated to open its normally closed contacts $R_{11}$ and $R_{12}$. Therefore, even if the mode selector switch 62 is turned on (travel mode), the relays $R_2$ to $R_4$ remain deactuated, holding their contacts $R_{21}, R_{31}, R_{41}, R_{42}$ and $R_{43}$ in an open state to de-energize all of the solenoids 411, 431, 441 and 451. As a result, the change-over valves 41, 430, 44 and 45 are retained in positions c, g, j and m, respectively. The conduit 54 is communicated with the drain conduit 55 through the fourth change-over valve 44, making the accumulator 53 level with the tank pressure and holding the second change-over valve 420 in position e. Now, the respective change-over valves are interlocked in the working mode.

Thereafter, if the direction control valve 30 is switched to an operating position, the cylinder 50 is stretched or contracted in the same manner as in the embodiment of FIG. 1 to turn up or down the boom 3. The crane operations such as expanding or contracting the boom 3 and lifting up or down a suspended load are performed by switching other direction control valves. The discharge oil of the auxiliary pump 25 is fed to brake and clutch mechanisms of the winch without being supplied to the accumulator 53.

In crane operation, the respective change-over valves are interlocked in the working upon turning on the transmission switch 61, so that, even if the mode selector switch 62 is erroneously turned on (travel mode) during a crane operation, none of the change-over valves 41, 430 and 44 can be switched to the vehicle travel mode, nor the change-over valves 420 and 45 can be switched to positions f and n. Accordingly, crane operations can be performed safely without forming a closed circuit through the cylinder 50.

To start a vehicle travelling operation, the transmission switch 61 is turned off after setting the boom in the afore-mentioned appropriate travel position. As a result, the transmission mechanism 21 is swtiched off, stopping the main pumps 22 and 23 and de-energizing the relay $R_1$ of FIG. 3 to close the normally closed contacts $R_{11}$ and $R_{12}$. At this time, on the basis of signals received from the sensors 63, 64 and 65, the controller 68 checks if the boom length l, boom angle $\theta$ and weight of lifting load W are of appropriate values for travel. The circuit is closed (proceeding to the steps $S_2 \rightarrow S_3 \rightarrow S_4 \rightarrow S_5$ of FIG. 4) if they are all found to be appropriate for travel, and the circuit is opened (proceeding to step $S_6$) if any one of the received signal is found to be inappropriate for travel).

Thus, as long as all of the detected values of the sensor means 63, 64 and 65 are appropriate values for travel, the relay $R_2$ is energized to close the contact $R_{21}$ upon turning on (travel mode) the mode selector switch 62, and, upon lapse of a preset time length after energization of the relay $R_3$, the contact $R_{31}$ is closed. Then, the relay $R_4$ is energized to close its self-retaining contact $R_{41}$ which retains the energized state of relay R4, closing the contacts $R_{42}$ and $R_{43}$ to energize the solenoids 431 and 441. As a result, the third and fourth change-over valves 430 and 44 are switched to position h and k, respectively. Since the UP switch 66 and DOWN switch 67 are not operated to this moment, the solenoid 451 is de-energized while the solenoid 411 is energized, holding the fifth change-over valve 45 in position m and switching the first change-over valve 41 to position d (proceeding to steps $S_5 \rightarrow S_7 \rightarrow S_9 \rightarrow S_{11}$).

As the change-over valve 41, 430 and 44 are switched to positions d, h and k (travel mode positions), the conduits 35 and 54 are communicated with each other, blocking oil flow from the conduit 35 to conduit 32 and from the conduit 54 to conduit 55. As the accumulated pressure of the accumulator 53 is still at the tank pressure in the initial phase immediately after the switch to the travel mode, the second change-over valve 420 is still in position e, blocking oil flow from conduit 34 to conduit 35. Besides, the oil flow from conduit 34 to conduit 31 is blocked by the counter-balancing valve 33 to prevent contraction of the cylinder 50, holding the boom 3 at the initial appropriate height $H_1$.

Now, as soon as the switch 66 is turned on to accumulate pressure in the accumulator 53, the solenoid 451 is energized to switch the fifth change-over valve 45 into position n ($S_7 \rightarrow S_8$). At this time, although the transmission mechanism 21 is off and main pumps 22 and 23 at rest, the oil pressure from the auxiliary pump 25, which is constantly driven from the engine 20, is supplied to and accumulated in the accumulator 53 through the change-over valve 45. As the accumulated pressure of the accumulator 53 reaches a predetermined level, the second change-over valve 420 is thereby switched to position f to communicate conduits 34 and 35 with each other. Thereafter, upon turning off the UP switch 66, the solenoid 451 is de-energized to return the fifth change-over valve 45 to position m shown ($S_7 \rightarrow S_9 \rightarrow S_{11}$).

In this manner, the change-over valves 41, 420, 430, 44 and 45 are switched to positions d, f, h, k and m, respectively, forming a closed circuit through the opposite oil chambers 51 and 52 of the cylinder 50 and the accumulator 53 to produce the displacement suppressing effects by the same action as described hereinbefore with reference to FIG. 1.

According to this embodiment, when the transmission mechanism 21 is turned on to drive the pumps 22 and 23 in a crane operation, the respective change-over valves are interlocked in the working mode. When the transmission mechanism 21 is turned off during vehicle travel, each one of the change-over valves is controlled to dissapprove shift to travel mode position even if the mode selector switch is turned on, as long as any one of the detected values from the boom length sensor 65, boom angle sensor 64 and suspended load weight sensor 65 is not a predetermined appropriate value. Accordingly, there is no possibility of the cylinder 50 forming a closed circuit even in the event of an operation error, further enhancing safety in operation.

In addition, the second change-over valve 420 is shifted to position f to communicate the conduits 34 and 35 after a predetermined pressure has been accumulated in the accumulator 53, so that the cylinder 50 is free of the contraction which would occur in an initial phase of operation immediately after switch to the travel mode in an extent corresponding to the compression volume of the accumulator 53 as explained hereinbefore in relation with the embodiment of FIG. 1, holding the boom 3 at the initially set appropriate height $H_1$ during vehicle travel while producing the displacement suppressing action appropriately.

The capacity of pressure accumulation of the accumulator 53 is determined depending upon the preset pressure level of the auxiliary relief valve 252. However, due to an error in accuracy or an error in preset condition of the relief valve 252, a difference may occur between the load holding pressure in the first oil chamber 51 and the accumulated pressure in the accumulator 53 when the boom 3 is in an appropriate travel position, the pressure difference causing the cylinder 50 to contract or stretch slightly upon shifting the second change-over valve 420 into position f varying the height of the boom 3 from the initially set appropriate level.

In a case where the cylinder 50 is contracted from the appropriate length for travel, the UP switch 66 is turned on, whereupon the fifth change-over valve 45 is shifted to position n by the same action as at the time of pressure accumulation to the accumulator 53, supplying the discharge oil of the pump 25 to the conduit 56 and then to the first oil chamber 51 through the third change-over valve 430 in position h and the second change-over valve 420 in position f to stretch the cylinder 50 until the boom is lifted up to the initial appropriate height $H_1$. At this time, the second conduit 35 is blocked by the first change-over valve 41, communicating the conduits 34 and 35 with each other by a closed circuit, so that the cylinder 50, though stretched in the fashion of a ram cylinder, has no possibilities of increasing the pressures in the oil chambers 51 and 52 to an abnormally high level or possibilities of rupturing in the vehicle travel mode where the boom is in its shortest length and free of any lifting load.

In a case where the cylinder 50 is stretched beyond the appropriate travel length by the accumulated pressure of the accumulator 53 which switches the second change-over valve 420 to position f, the DOWN switch 67 is pressed (off). By so doing, the solenoid 411 is de-energized (steps $S_9 \rightarrow S_{10}$), returning the first change-over valve 41 to position c to communicate the conduit 35 with conduit 32. At this time, the second change-over valve 420 is in position f, so that the oil pressure in the first oil chamber 51 of the cylinder 50 is drained to the tank 24 through the second change-over valve 420 in position f, first change-over valve 41 in position c and the throttle 301 of the direction control valve 30, shrinking the cylinder 50 to lower the boom. By closing the DOWN switch at the time point when the boom 3 reaches the appropriate height $H_1$, the solenoid 411 is energized (steps $S_9 \rightarrow S_{11}$) to switch the first change-over valve 41 to position d.

Even after the operation has been switched to the vehicle travel mode in this manner, an inadvertent downfall of the boom 3 is prevented by the cylinder 50, while permitting a boom-up or boom-down operation as desired by the use of the oil pressure from the auxiliary pump 25 after shifting the change-over valves 45 and 41 through operation of the switches 66 and 67. Thus, in addition to the displacement suppressing action, the boom 3 can be easily adjusted (corrected) precisely to the appropriate height $H_1$.

In the foregoing embodiment, instead of making discrimination between the on- and off-states of the transmission switch 61 or the transmission mechanism 21, the above-described control may be performed on the basis of the driven or non-driven state of the main pumps 22 and 23 as detected by way of their rotational movement or flow rate or pressure of discharge oil from the pumps.

In this type of mobile crane, the upper rotary structure is often fixed to the lower vehicle structure by a lock pin to prevent its rotation during travel of the vehicle. In such cases, output signal of a lock pin sensor means is supplied to the controller 60 of FIG. 3. For example, a step is added between steps $S_4$ and $S_5$ in the flowchart of FIG. 4 to check whether or not the lock pin is engaged (locking the upper rotary structure against rotation), proceeding to step $S_5$ if "Yes" and to step $S_6$ if "No".

Further, one or all of the operations of verifying the appropriate travel conditions based on the values detected by the boom length sensor means 63, boom length sensor means 64, lifting weight sensor means 65 and lock pin sensor means may be omitted is desired.

It will be appreciated from the foregoing description that, according to the present invention, the comfort of ride is improved by the vibration suppressing action of the boom uplifting cylinder and accumulator during travel of the vehicle, and, even if an operator made an operational error, an abnormal pressure increase in the first oil chamber which holds the load of the cylinder could be prevented securely, precluding abrupt downfalls of the boom as well as overloading damage to the cylinder. Besides, the apparatus of the invention contributes to reduce troubles and facilitate maintenance and service.

In a case where the mode change-over means employs the first to third change-over valves of the electromagnetic type, the oil flow in various parts of the circuit can be controlled appropriately to effect the operation of switching the mode between the travel and working modes and to perform the vehicle travel and crane operations smoothly.

In a case where the second change-over valve is constituted by a pilot-operated change-over valve as described hereinbefore, it can cope with operations requiring a greater capacity and higher working pressures, enhancing the practical value of the apparatus.

Further, where the respective change-over valves are switched by the controller in relation with the transmission switch and on the basis of the signal from the mode selector switch, the automatic control is performed constantly in an appropriate manner, further enhancing the maneuverability and controllability along with safety.

Where the control based on the signals operating conditions of the boom such as boom length is added as described hereinbefore, the accuracy of control as well as safety can be enhanced all the more.

In a case using the auxiliary pump which is constantly driven from the engine, in combination with the fourth and fifth change-over valves, it becomes possible to accumulate a predetermined pressure accurately in the accumulator, preventing a slight drop of the boom in an initial phase of the operation immediately after a swtich to the travel mode, thus maintaining the boom in an appropriate position for travel to perform the displacement suppressing function effectively for improving the comfort of ride to a marked degree.

What is claimed is:

1. An apparatus for suppressing quaky movements of a mobile type crane, comprising:
   a vehicle body supported on driven wheels;
   a boom including a hydraulic cylinder and pivotally supported on said vehicle body via said hydraulic cylinder for pivoting movements about a horizontal shaft;
   main hydraulic pumps connected through a transmission mechanism to an engine mounted on said vehicle body and switchable between on- and off-positions;
   a direction control valve for respectively selectively supplying and draining the discharge oil pressures of said main pumps to and from a first load-holding main oil chamber and an opposing second oil chamber of said hydraulic cylinder;
   a counter-balancing valve provided at a position fluidically between said hydraulic cylinder and said direction control valve;
   an accumulator provided at a position fluidically between said hydraulic cylinder and said counter-balancing valve for suppressing quaky movements of said vehicle body;
   travel and work mode switching means comprising a plurality of change-over valves;
   a mode selector means for switching the mode of operation between a vehicle travel mode wherein a closed circuit is formed through said first and second oil chambers and said accumulator, and a working mode wherein the closed circuit is opened for supplying and draining oil pressure separately to and from said first and second oil chambers; and
   a controller having means for permitting said mode selector means to switch to said travel mode position only when said main pumps are in an off state.

2. An apparatus as defined in claim 1, wherein said mode switching means comprises a first change-over valve selectively switchable between a working mode position for communicating said second oil chamber with said direction control valve and a travel mode position for blocking outflow of oil pressure from said second oil chamber to said direction control valve, a second change-over valve selectively switchable between a working mode position for blocking inflow of oil pressure to said second oil chamber from said first oil chamber of said hydraulic cylinder and a travel mode position for communicating said two oil chambers with each other, and a third change-over valve selectively switchable between a working mode position for blocking inflow of oil pressure into said accumulator from said second oil chamber and a travel mode position for communicating said second oil chamber with said acculumator.

3. An apparatus as defined in claim 2, wherein said first and third change-over valves of said mode switching means are each constituted by an electromagnetic change-over valve, while said second change-over valve is constituted by a pilot-operated change-over valve and wherein said controller comprises means for positioning said pilot-operated change-over valve in said working mode position when a pilot pressure applied from an accumulator conduit between said third change-over valve and said accumulator is lower than a predetermined level and otherwise for positioning said pilot-operated change-over value in said travel mode position.

4. An apparatus as defined in claim 3, further comprising a transmission switch for turning on and off said transmission mechanism, and a mode selector switch for selecting either one of said working and travel modes, and wherein said controller is provided with a control means for switching the respective electromagnetic valves to their travel mode positions when said transmission mechanism is off and the travel mode is selected by said mode selector means, and otherwise holding said electromagnetic valves in said working mode positions.

5. An apparatus as defined in claim 4, further comprising a boom sensor means for detecting operating conditions of said boom, and wherein said controller is provided with control means for switching the respective electromagnetic valves to said travel mode positions when receiving a signal indicative of an off-state of said transmission mechanism, a travel mode selection signal produced by said mode selector switch and a signal indicative of a normal boom position for travel.

6. An apparatus as defined in claim 5, further comprising an auxiliary hydraulic pump constantly driven from said engine, a fourth change-over valve of an electromagnetic type selectively switchable between a working mode position for draining oil pressure from said accumulator and a travel mode position for blocking outflow of oil pressure from said accumulator, and a fifth change-over valve of an electromagnetic type selectively switchable between an oil supply position for supplying oil pressure from said auxiliary pump to said accumulator and a blocking position for blocking said oil supply.

* * * * *